(12) United States Patent
Ichimura

(10) Patent No.: US 12,279,027 B2
(45) Date of Patent: Apr. 15, 2025

(54) IMAGE PROCESSOR, IMAGE FORMING APPARATUS, AND IMAGE PROCESSING METHOD

(71) Applicant: Shuji Ichimura, Kanagawa (JP)

(72) Inventor: Shuji Ichimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 174 days.

(21) Appl. No.: 18/346,475

(22) Filed: Jul. 3, 2023

(65) Prior Publication Data
US 2024/0040214 A1   Feb. 1, 2024

(30) Foreign Application Priority Data
Jul. 27, 2022  (JP) .................. 2022-119397

(51) Int. Cl.
*H04N 23/11* (2023.01)
*G06T 5/70* (2024.01)
*H04N 23/15* (2023.01)

(52) U.S. Cl.
CPC ............ *H04N 23/11* (2023.01); *G06T 5/70* (2024.01); *H04N 23/15* (2023.01); *G06T 2207/10008* (2013.01); *G06T 2207/10024* (2013.01)

(58) Field of Classification Search
CPC .......... H04N 23/11; H04N 23/15; G06T 5/70
USPC ........................................ 348/272
See application file for complete search history.

(56) References Cited

U.S. PATENT DOCUMENTS

| 11,190,666 B2* | 11/2021 | Ohmiya ............... G06V 10/225 |
| 11,695,892 B2* | 7/2023 | Nakamura ........... H04N 1/3878 |
| | | 382/289 |
| 2020/0053230 A1 | 2/2020 | Nakazawa et al. |
| 2021/0021729 A1 | 1/2021 | Hashimoto et al. |
| 2021/0409566 A1 | 12/2021 | Hashimoto |

FOREIGN PATENT DOCUMENTS

| JP | 2007-043427 | 2/2007 |
| JP | 2021-016132 | 2/2021 |
| JP | 2021-093717 | 6/2021 |

OTHER PUBLICATIONS

Extended European Search Report for 23187509.7 mailed on Jan. 3, 2024.

\* cited by examiner

*Primary Examiner* — Joel W Fosselman
(74) *Attorney, Agent, or Firm* — IPUSA, PLLC

(57) ABSTRACT

An image processor includes a memory, a signal processing circuit to process a visible light component including an invisible light component and an invisible light component from an image sensor, a signal setting circuit to set a first enable signal valid in a first period based on execution of signal processing, and set a second enable signal valid after the first period elapses, an offset component removal circuit to remove an offset component from the visible light component and the invisible light component in a period in which the first enable signal is valid while storing data in process in the memory, and an invisible component removal circuit to remove the invisible light component from the visible light component, to output image data of a visible light component in a period in which the second enable signal is valid while storing data in process in the memory.

8 Claims, 6 Drawing Sheets

IMAGE PROCESSOR, IMAGE FORMING APPARATUS, AND IMAGE PROCESSING METHOD

CROSS-REFERENCE TO RELATED APPLICATIONS

This patent application is based on and claims priority pursuant to 35 U.S.C. § 119(a) to Japanese Patent Application No. 2022-119397, filed on Jul. 27, 2022, in the Japan Patent Office, the entire disclosure of which is hereby incorporated by reference herein.

BACKGROUND

Technical Field

Embodiments of the present disclosure relate to an image processor, an image forming apparatus, and an image processing method.

Related Art

There are image processing apparatuses that simultaneously irradiate a subject with visible light and invisible light to read an image thereof, and acquire invisible light image data or visible light image data from image data acquired by the reading. Such an image processing apparatus includes a visible light image sensor that detects a visible light component including an invisible light component and an invisible light image sensor that detects the invisible light component.

For example, a related-art image processing apparatus removes an offset component from the visible light component detected by the visible light image sensor and removes the offset component from the invisible light component detected by the invisible light image sensor. After removing the offset component from each of the invisible light component and the visible light component, the image processing apparatus removes, from the visible light component, the invisible light component. Further, the image processing apparatus performs shading correction on the image data of the visible light component from which the invisible light component has been removed, to generate visible light image data.

SUMMARY

In one aspect, an image processor includes a memory; a signal processing circuit, a signal setting circuit, an offset component removal circuit, and an invisible component removal circuit. The signal processing circuit performs signal processing on a first visible light component and a first invisible light component received from an image sensor, to generate a second visible light component and a second invisible light component, respectively. The first visible light component includes an invisible light component. The signal setting circuit sets a first operation enable signal to a valid level in a first period based on execution of the signal processing, and sets a second operation enable signal to a valid level after an elapse of the first period. The offset component removal circuit performs an offset component removal operation in a period in which the first operation enable signal indicates the valid level while storing data in process in the memory. In the offset component removal operation, an offset component is removed from each of the second visible light component and the second invisible light component, to output a third invisible light component and a third visible light component, respectively. The invisible component removal circuit performs an invisible component removal operation in a period in which the second operation enable signal indicates the valid level while storing data in process in the memory. In the invisible component removal operation, the third invisible light component is removed from the third visible light component, to generate image data of a fourth visible light component from which the invisible light component has been removed.

In another aspect, an image forming apparatus includes an image reader including an image sensor, the image processor described above, and an image forming device to form an image using the image data processed by the image processor.

Another aspect concerns a method for processing a visible light component and an invisible light component. The method includes performing signal processing on a first visible light component including an invisible light component received from an image sensor and a first invisible light component received from the image sensor, to generate a second visible light component and a second invisible light component, respectively; setting a first operation enable signal to a valid level in a first period based on execution of the signal processing; and performing an offset component removal operation in a period in which the first operation enable signal indicates the valid level while storing data in process in a memory. In the offset component removal operation, an offset component is removed from each of the second visible light component and the second invisible light component, to output a third invisible light component and a third visible light component, respectively. The method further includes setting a second operation enable signal to a valid level after an elapse of the first period, and performing an invisible component removal operation in a period in which the first operation enable signal indicates the valid level while storing data in process in the memory. In the invisible component removal operation, the third invisible light component is removed from the third visible light component, to output image data of a fourth visible light component.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
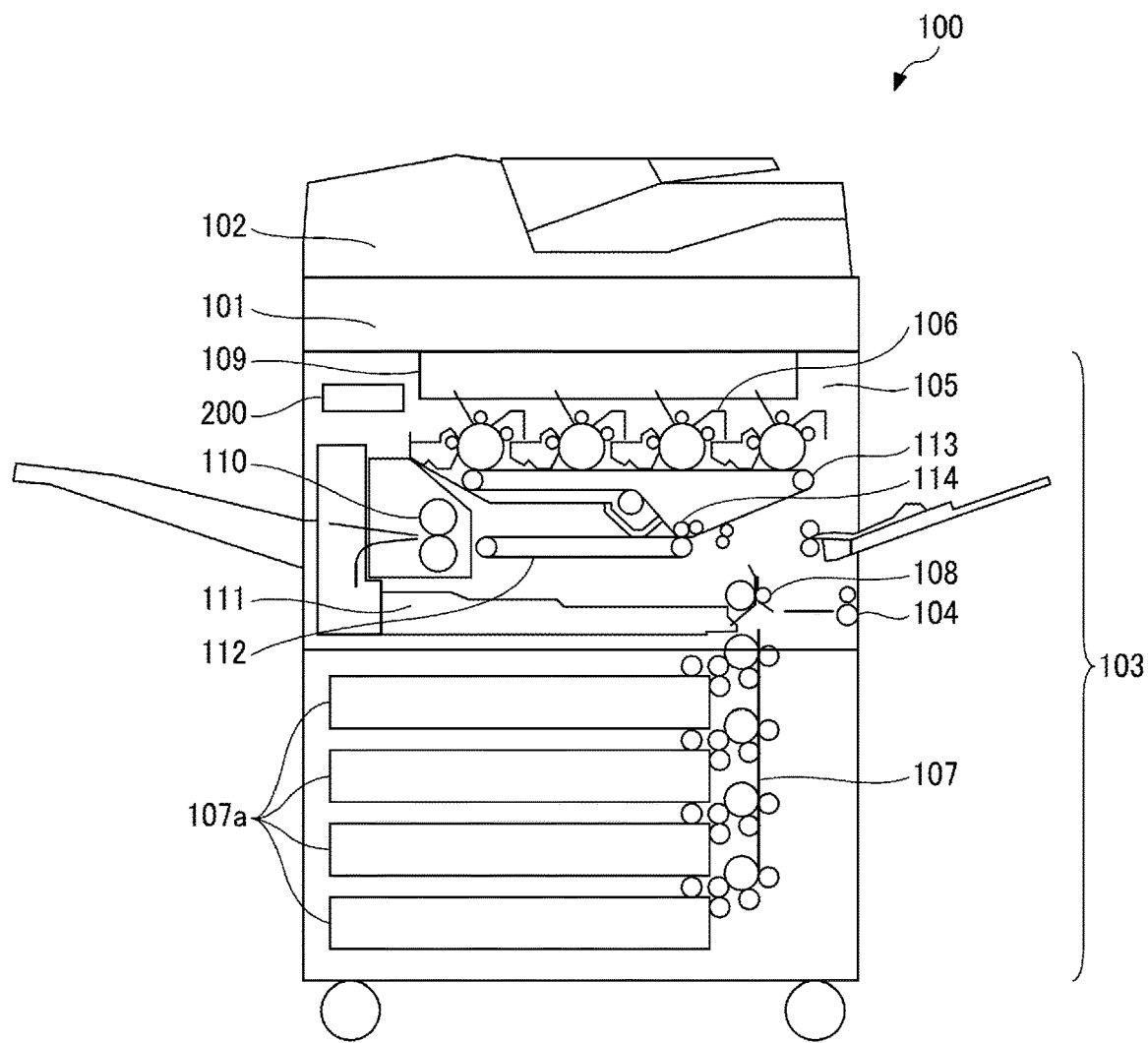
FIG. 1 is a diagram illustrating an overall configuration of an image forming apparatus including an image processor according to embodiments of the present disclosure.

The accompanying drawings are intended to depict embodiments of the present disclosure and should not be interpreted to limit the scope thereof. The accompanying

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In the description below, signal lines through which signals are transmitted are denoted by reference characters same as or similar to the signal names. In each drawing, like reference numerals are allocated to components or portions having the same or similar configuration, and redundant descriptions may be omitted.

A first embodiment is described below.

FIG. 1 is a diagram illustrating an overall configuration of an image forming apparatus including an image processor according to the first embodiment of the present disclosure. An image forming apparatus 100 illustrated in FIG. 1 is, for example, a digital multifunction printer (MFP) having, for example, a copy function, a print function, a scanner function, and a facsimile function.

The image forming apparatus 100 can switch its operation mode among a mode for the copy function, a mode for the print function, a mode for the scanner function, and a mode for the facsimile function in response to, for example, pressing of an application switching key provided on a control panel. The image forming apparatus 100 operates in a copy mode when the copy function is selected, operates in a printer mode when the printer function is selected, operates in a scanner mode when the scanner function is selected, and operates in a facsimile mode when the facsimile function is selected.

The image forming apparatus 100 switches between, for example, normal modes and an energy saving mode (power saving mode) according to a state of an internal circuit. For example, the normal modes include an in-operation mode (being operating) and a standby mode (being at standby).

For example, the apparatus is in the in-operation mode when printing an image or text data on a recording medium such as a paper sheet in the copy mode or the print mode. Operations performed in the print mode include printing, on a recording medium, data received in the facsimile mode. Further, the apparatus is in the in-operation mode when transmitting and receiving data in the scanner mode for scanning a document or a facsimile mode. The state of the internal circuit is switched by an operation of the control panel by a user of the image forming apparatus 100 or by a control operation in the image forming apparatus 100.

The image forming apparatus 100 includes an image reading unit 101 (image reader), an automatic document feeder (ADF) 102, and an image forming unit 103 (image forming device). In FIG. 1, an interior of the image forming unit 103 is illustrated in order to make the description easy to understand. The image forming unit 103 includes a bypass feeding roller pair 104, a tandem image forming unit 105, image forming elements 106, a recording sheet feeder 107, and a plurality of sheet trays 107a. The image forming unit 103 further includes a registration roller pair 108, an optical writing device 109, a fixing device 110, a reversing assembly 111, a secondary transfer belt 112, an intermediate transfer belt 113, a transfer unit 114, and an image processor 200.

The ADF 102 automatically feeds a document placed on the placement table to an image reading position.

Figure 2:
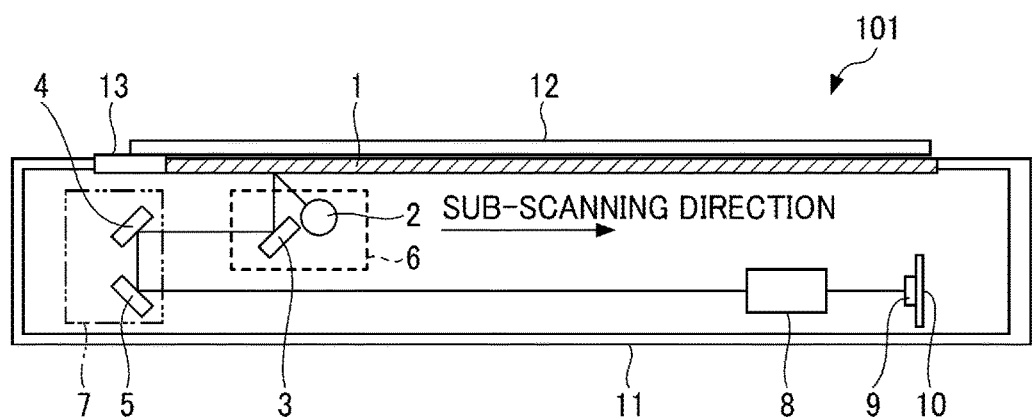
FIG. 2 is a cross-sectional view of an image reading unit of the image forming apparatus illustrated in FIG. 1.
Figure 3:
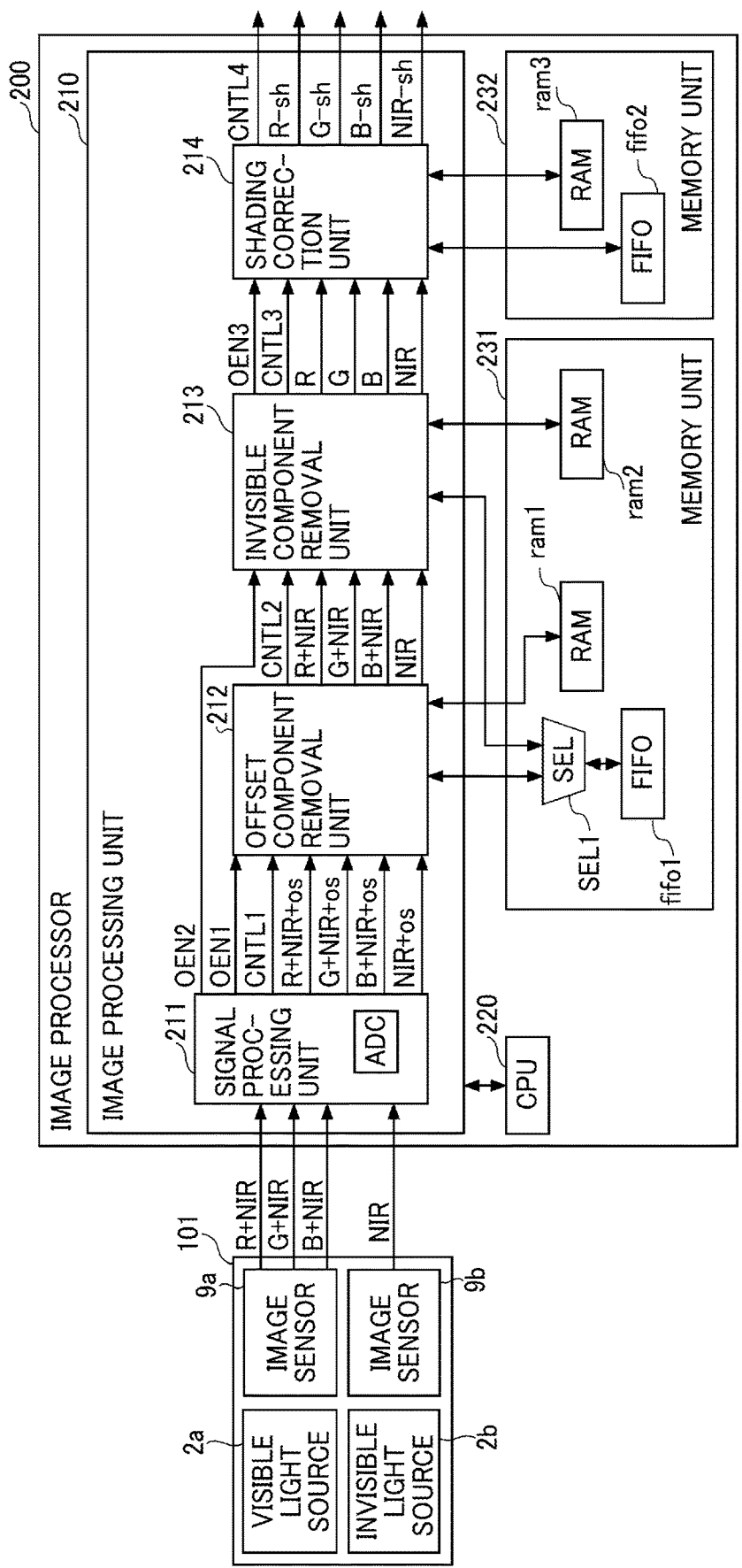
FIG. 3 is a block diagram of an image processor according to a first embodiment.

The image reading unit 101 is, for example, a scanner including an image sensor and reads an image of the document fed to the image reading position by the ADF 102. FIG. 2 illustrates a configuration of the image reading unit 101. The image processor 200 performs processing on image data of the document read by the image reading unit 101. FIG. 3 illustrates a configuration of the image processor 200.

The image forming unit 103 prints an image on a recording sheet by an electrophotographic method based on image data read from a document by the image reading unit 101 and processed by the image processor 200. The method employed by the image forming unit 103 is not limited to the electrophotographic method. The image forming unit 103 may print an image on a recording sheet by an inkjet method.

The bypass feeding roller pair 104 feeds a recording sheet placed by a user into the image forming unit 103. The recording sheet feeder 107 includes an assembly that sends out recording sheets one by one from one of the sheet trays 107a each containing the recording sheets. The registration roller pair 108 conveys the recording sheet fed from the bypass feeding roller pair 104 or the recording sheet feeder 107 to the secondary transfer belt 112.

The optical writing device 109 converts the image data read by the image reading unit 101 and processed by the image processor 200 into optical information. The tandem image forming unit 105 includes, for each of yellow, magenta, cyan, and black, a photoconductor drum and the image forming elements 106 disposed around the photoconductor drum. The image forming elements 106 include a charging roller, a developing device, a primary transfer roller, a cleaner unit, and a discharger. In this disclosure, the colors yellow, magenta, cyan, and black are represented by characters Y, M, C, and K, respectively.

The image forming element 106 forms, on each photoconductor drum, a toner image corresponding to individual color image information converted by the optical writing device 109. The respective toner images on the photoconductor drums are primarily transferred and superimposed onto the intermediate transfer belt 113 by the primary transfer roller. The superimposed toner images form a full-color toner image on the intermediate transfer belt 113. The full-color image is conveyed to the transfer unit 114 as the intermediate transfer belt 113 travels (rotates), and is transferred onto a recording sheet on the secondary transfer belt 112 in the transfer unit 114.

The recording sheet on which the toner image has been transferred is conveyed to the fixing device 110 as the secondary transfer belt 112 travels. The fixing device 110 fixes the toner image on the recording sheet. Then, the recording sheet on which the toner image is fixed is ejected from a discharge section, and the printing process of the color image on the recording sheet is completed.

In duplex printing for printing images on both sides of a recording sheet, the reversing assembly 111 reverses the recording sheet upside down and sends out the reversed recording sheet onto the secondary transfer belt 112.

FIG. 2 is a cross-sectional view of the image reading unit 101 illustrated in FIG. 1. The image reading unit 101 includes a main body 11, an exposure glass 1 disposed on the main body 11, and a reference white plate 13 having a white color serving as a reference. The main body 11 includes a first carriage 6, a second carriage 7, a lens unit 8, and a sensor board 10 on which image sensors 9 (image sensors 9a and 9b illustrated in FIG. 3) is mounted. The first carriage 6 includes light sources 2 (a visible light source 2a and an invisible light source 2b illustrated in FIG. 3) and a mirror 3. The second carriage 7 includes the mirrors 4 and 5.

For example, the light sources 2 are light emitting diodes (LED). For example, each of the image sensors 9 is a line sensor such as a charge coupled device (CCD) image sensor or a complementary metal oxide semiconductor (CMOS) image sensor. Each of the image sensor 9 has a plurality of pixels arranged along a main scanning direction (which is orthogonal to a sub-scanning direction illustrated in FIG. 2 and a depth direction in FIG. 2).

In image reading, the image reading unit 101 irradiates the document 12 placed on the exposure glass 1 with light from the light sources 2. The image reading unit 101 moves the first carriage 6 and the second carriage 7 from respective standby positions (home positions) in the sub-scanning direction while the document 12 is irradiated with light. The first carriage 6 and the second carriage 7 moving in the sub-scanning direction sequentially guide the light reflected from a region of the document 12 facing the mirror 3 to the lens unit 8. The first carriage 6 and the second carriage 7 cause the light reflected from the document 12 to be imaged on the image sensor 9 via the lens unit 8.

For example, when a power supply is turned on, the image reading unit 101 moves the first carriage 6 to a position facing the reference white plate 13 and turns on the light sources 2. The image reading unit 101 forms an image of the light reflected from the reference white plate 13 on the image sensors 9, acquires white distribution data in the main scanning direction, and performs gain adjustment, to define reference data. The reference data is stored in a memory and is used for shading correction for correcting, for example, color unevenness of the read image.

As will be described below with reference to FIG. 3, the image reading unit 101 includes the visible light source 2a that emits visible light and the invisible light source 2b that emits invisible light, which are collectively referred to as the light sources 2. The visible light source 2a irradiates the document 12 with invisible light in addition to visible light. The invisible light source 2b irradiates the document 12 with invisible light not including visible light.

The image reading unit 101 includes, as the image sensors 9, the image sensor 9a that receives reflection light of the light emitted from the visible light sources 2a to the document 12 and the image sensor 9b that receives reflection light of the light emitted from the invisible light source 2b to the document 12. For example, the image sensor 9a is a red-green-blue (RGB) image sensor including a plurality of pixels arranged in the main scanning direction. provided with three types of filters, respectively. The pixels of the RGB image sensor respectively include three types of filters to transmit red light R, green light G, and blue light B. For example, the image sensor 9b is a near-infrared image sensor including a plurality of pixels arranged in the main scanning direction. Each of the pixels of the near-infrared image sensor includes a filter that transmits near-infrared light NIR.

In the description below, regarding the image sensors 9 (9a and 9b), a column of pixels arranged in the main scanning direction is also referred to as a line. The image sensors 9 (9a and 9b) acquire the image data each time the the first carriage 6 and the second carriage 7 move by one line in the sub-scanning direction, which is also referred to as pixel data of one line. A light component of the red light R is also referred to as a light component R, a light component of the green light G is also referred to as a light component G, and a light component of the blue light B is also referred to as a light component B. A light component of the near-infrared light NIR is also referred to as a light component NIR.

Instead of the image sensors 9a and 9b, the image reading unit 101 may include an image sensor 9 including a plurality of pixels provided with four types of filters that transmit the red light R, the green light G, the blue light B, and the near-infrared light NIR, respectively.

FIG. 3 is a block diagram of the image processor 200 illustrated in FIG. 1, according to the first embodiment. The image processor 200 is connected to the image reading unit 101 to communicate with the image reading unit 101. The image sensor 9a receives light reflected from the document 12 irradiated with light from the visible light source 2a and outputs light components as analog signals to the image processor 200. Specifically, the image sensor 9a outputs, as analog signals, a combination of a light component (analog signal) R and a light component NIR (R+NIR), a combination of a light component G and a light component NIR (G+NIR), and a combination of a light component B and a light component NIR (B+NIR). The image sensor 9a serves as a first image sensor that detects visible light components including invisible light components. The light components output from the image sensor 9a are examples of a first visible light component.

The image sensor 9b receives light reflected from the document 12 irradiated with light from the invisible light source 2b and outputs a light component NIR, as an analog signal, to the image processor 200. The image sensor 9b serves as a second image sensor that detects an invisible light component. The invisible light component output from the image sensor 9b serves as a first invisible light component.

The image processor 200 includes an image processing unit 210 that performs image processing, a central processing unit (CPU) 220, and memory units 231 and 232 (storage units). The image processing unit 210 includes a signal processing unit 211, an offset component removal unit 212, an invisible component removal unit 213, and a shading correction unit 214.

For example, each time pixel data of one line is received from the image reading unit 101, the image processing unit 210 sequentially performs, for the pixel data, signal processing, offset component removal, invisible component removal, and shading correction. For example, the image processing unit 210 sequentially receives pieces of pixel data of one line and performs, for each piece of the pixel data, the signal processing, the offset component removal, the invisible component removal, and the shading correction in the order of reception. Alternatively, the image processing unit 210 may perform the processing of the pixel data each time pixel data of a plurality of lines is received.

Although, in the description below, pixel data of one line is processed at a time for simplifying the description, pixel data of a plurality of lines may be processed at a time. The image processing unit 210 may be mounted on, for example, a semiconductor chip such as an application specific integrated circuit (ASIC) or a field-programmable gate array (FPGA). For example, the image processing unit 210 is mounted on a control board together with the CPU 220 and the memory units 231 and 232. The memory unit 231 includes a selector SEL1, a first-in first-out (FIFO) memory fifo1 for data in process of operation, and random access memories (RAM) ram1 and ram2 for coefficients. The memory unit 232 includes a FIFO memory fifo2 for operation and a RAM ram3 for coefficients.

The signal processing unit 211 sequentially receives the light components (analog signals) R+NIR, G+NIR, B+NIR, and NIR of one line from the image reading unit 101. The signal processing unit 211 performs signal processing for converting the received analog signals into digital signals by a built-in analog-to-digital converter (ADC). When the ADC converts the light components (analog signals) R+NIR, G+NIR, B+NIR, and NIR into digital signals, an offset component os is added to the digital signals. In the description below, light components (digital signals) R+NIR, G+NIR, B+NIR, and NIR to which the offset component os is added are referred to as light components (digital signals) R+NIR+os, G+NIR+os, B+NIR+os, and NIR+os. The offset component removal unit 212, the invisible component removal unit 213, and the shading correction unit 214 receive and output a light component as a digital signal.

The signal processing unit 211 sequentially outputs the light components R+NIR+os, G+NIR+os, B+NIR+os, and NIR+os of one line to which the offset is added to the offset component removal unit 212. The light components output from the signal processing unit 211 serve as second visible light components and a second invisible light component. In addition, each time processing of one line is performed, the signal processing unit 211 outputs an operation enable signal OEN1 for permitting execution of the removal processing of the offset components os and a control signal CNTL1 for controlling the operation of the offset component removal unit 212, to the offset component removal unit 212.

Further, each time processing of one line is performed, the signal processing unit 211 outputs an operation enable signal OEN2 for permitting execution of the invisible component removal processing, to the invisible component removal unit 213. The signal processing unit 211 outputs the operation enable signals OEN1 and OEN2 at such timings that valid levels (for example, high levels) of the operation enable signals OEN1 and OEN2 do not overlap each other. The operation enable signal OEN1 serves as a first operation enable signal, and the operation enable signal OEN2 serves as a second operation enable signal.

The offset component removal unit 212 performs an operation for removing the offset component os from each of the light components R+NIR+os, G+NIR+os, and B+NIR+os, which are visible light components, according to the control signal OEN1 in a period in which the operation enable signal CNTL1 indicates the valid level. The light components output from the offset component removal unit 212 serve as a third visible light components and a third invisible light component. In addition, the offset component removal unit 212 performs an operation for removing the offset components os from the light component NIR+os, which is an invisible light component, in the period in which the operation enable signal OEN1 indicates the valid level.

When executing the operation for removing the offset components os (in a first period Tp1 in FIG. 4 in which the operation enable signal OEN1 is at the high level), the offset component removal unit 212 stores, in the FIFO memory fifo1, the data in process of the removal operation. The offset component removal unit 212 sequentially outputs the light components R+NIR, G+NIR, B+NIR, and NIR for one line, from which the offset components os have been removed by operation, to the invisible component removal unit 213 in addition to the control signal CNTL2.

The invisible component removal unit 213 performs an operation for removing the invisible light component (the light component NIR) from each of the light components R+NIR, G+NIR, and B+NIR, which are visible light components for one line, according to the control signal OEN2 in a period in which the operation enable signal CNTL2 indicates the valid level. Then, the invisible component removal unit 213 generates the light components R, G, and B from which the invisible light component (the light component NIR) is removed. The light components output from the invisible component removal unit 213 serve as fourth visible light components.

When executing the operation for removing the light component NIR, which is the invisible light component (in a second period Tp2 in FIG. 4 in which the operation enable signal OEN2 is at the high level), the invisible component removal unit 213 stores the data in process of the operation in the FIFO memory fifo1. In the following description, the light component NIR may be also referred to as "invisible component NIR." In addition, the invisible component removal unit 213 outputs an operation enable signal OEN3 to the shading correction unit 214 in accordance with the generation of the light components R, G, and B. The operation enable signal OEN3 is set to valid (for example, set to the high level) during a period in which the shading correction unit 214 executes the shading correction.

The shading correction unit 214 corrects color unevenness and brightness unevenness of the light components R, G, and B according to the control signal CNTL3 while the operation enable signal OEN3 indicates the valid level. Further, the shading correction unit 214 corrects brightness unevenness of the light component NIR according to the control signal CNTL3 while the operation enable signal OEN3 indicates the valid level. For example, the color unevenness and the brightness unevenness of the light components R, G, and B are caused by the image sensor 9a or an optical system, and the brightness unevenness of the light components NIR is caused by the image sensor 9b or the optical system.

When executing the operation for correcting color unevenness and brightness unevenness (in the second period Tp2 in FIG. 4 in which the operation enable signal OEN2 is at the high level), the shading correction unit 214 stores the data in process of the operation in the FIFO memory fifo2. The shading correction unit 214 outputs, to the optical writing device 109, as image data, a light component R-sh (red light component after the shading correction) a light component G-sh (green light component after the shading correction), a light component B-sh (blue light component after the shading correction), and a light component NIR-sh (near-infrared light component after the shading correction) together with the control signal CNTL4.

The CPU 220 controls the entire operation of the image reading unit 101 by executing an image processing program. As described above, the memory unit 231 includes the selector SEL1, the FIFO memory fifo1 for data in process of operation, and the RAMs ram1 and ram2 for coefficients.

The memory unit 232 includes the FIFO memory fifo2 for operation and the RAM ram3 for coefficients.

The selector SEL1 connects the offset component removal unit 212 or the invisible component removal unit 213 to the FIFO memory fifo1. For example, the selector SEL1 connects the offset component removal unit 212 to the FIFO memory fifo1 while the enable signal OEN1 output from the signal processing unit 211 indicates the valid level. The selector SEL1 connects the invisible component removal unit 213 to the FIFO memory fifo1 while the enable signal OEN2 output from the signal processing unit 211 indicates the valid level. In this way, the FIFO memory fifo1 is shared by the offset component removal unit 212 and the invisible component removal unit 213.

The RAM ram1 stores a coefficient generated by the offset component removal unit 212 based on the result of the operation for offset component removal. The RAM ram2 stores a coefficient generated by the invisible component removal unit 213 based on the result of the operation for invisible light component removal. The RAM ram3 stores a coefficient generated by the shading correction unit 214 based on the result of the operation for shading correction.

Figure 4:
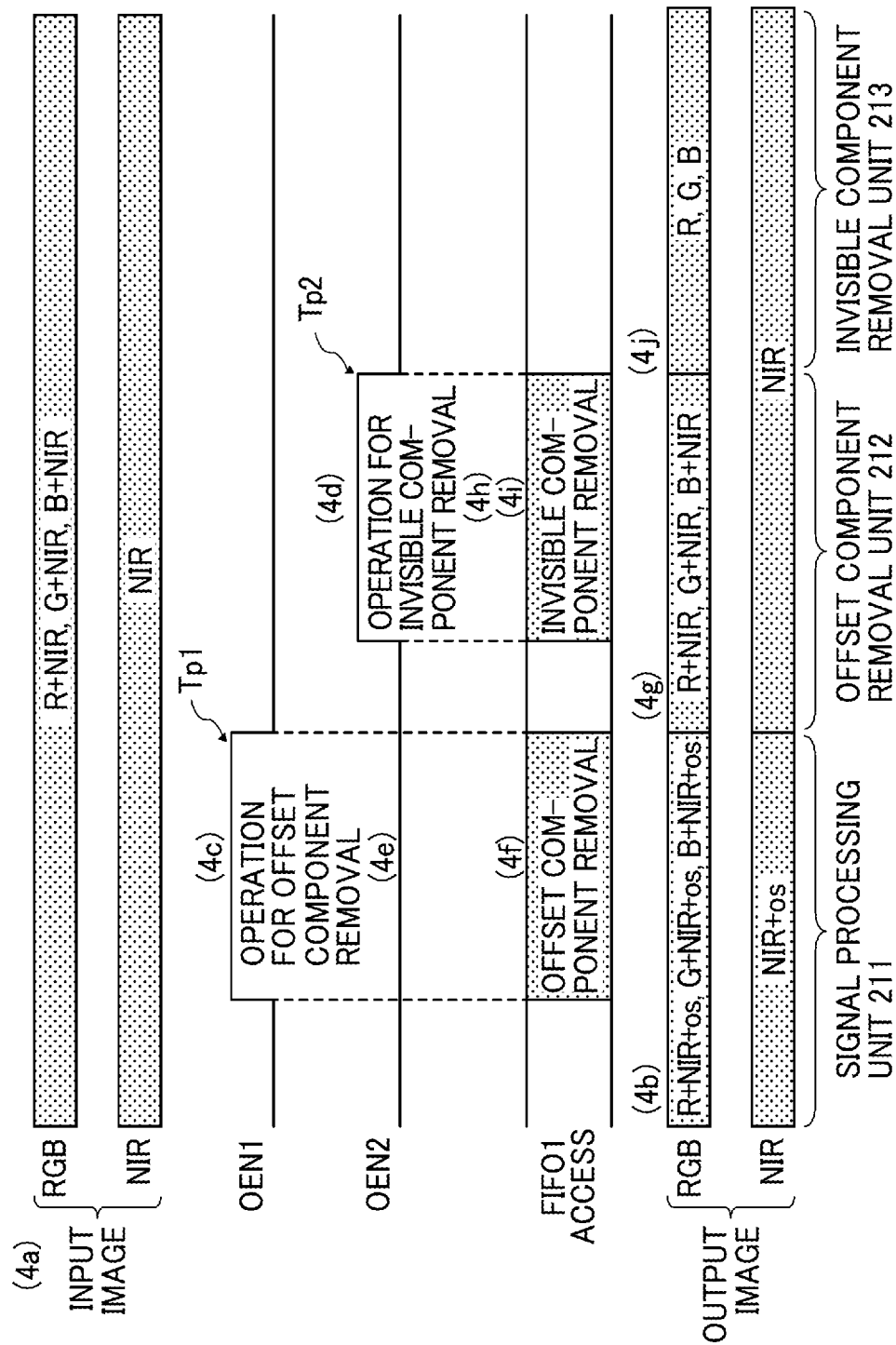
FIG. 4 is a timing chart illustrating an operation of the image processor illustrated in FIG. 3.

FIG. 4 is a timing chart illustrating an operation performed by the image processor 200 illustrated in FIG. 3. FIG. 4 illustrates, for example, in the processing of pixel data of one line, the offset component removal by the offset component removal unit 212 and the invisible component removal by the invisible component removal unit 213. Although pixel data of one line is processed in the example illustrated in FIG. 4, pixel data for a plurality of lines may be processed.

In (4a) of FIG. 4, the input image, which is pixel data (R+NIR, G+NIR, B+NIR, and NIR) of one line, is received from the image reading unit 101 to the signal processing unit 211. The signal processing unit 211 converts the pixel data (R+NIR, G+NIR, B+NIR, and NIR) received from the image reading unit 101 into digital signals. In (4b) of FIG. 4, the signal processing unit 211 outputs the pixel data (R+NIR+os, G+NIR+os, B+NIR+os, and NIR+os) to each of which the offset component os is added in the conversion into the digital signal.

In (4c) of FIG. 4, the signal processing unit 211 sets the operation enable signal OEN1 to the high level during a first period Tp1 in accordance with the output of the pixel data (R+NIR+os, G+NIR+os, B+NIR+os, and NIR+os). The first period Tp1 corresponds to the period in which the offset component removal unit 212 executes the operation for removing the offset component os from the pixel data (R+NIR+os, G+NIR+os, B+NIR+os, and NIR+os).

In addition, the signal processing unit 211 sets the operation enable signal OEN1 to the high level in the second period Tp2 after elapse of the first period Tp1 in which the operation enable signal OEN2 is at the high level. For example, the signal processing unit 211 sets the operation enable signal OEN2 to the high level in accordance with the start of the operation by the invisible component removal unit 213 for removing the invisible component NIR from the pixel data (R+NIR, G+NIR, and B+NIR) ((4d) of FIG. 4).

For example, the second period Tp2, in which the operation enable signal OEN2 is at the high level, corresponds to the period in which the invisible component removal unit 213 executes the operation for removing the invisible component NIR from the pixel data (R+NIR, G+NIR, and B+NIR). A functional unit of the signal processing unit 211 that generates the operation enable signals OEN1 and OEN2 serves as a signal setting unit.

In response to the rising edge of the operation enable signal OEN1, the offset component removal unit 212 removes the offset component os from the pixel data (R+NIR+os, G+NIR+os, B+NIR+os, and NIR+os) ((4e) of FIG. 4). When executing the operation for removing the offset component os (in the first period Tp1 in which the operation enable signal OEN1 is at the high level), the offset component removal unit 212 accesses the FIFO memory fifo1 to input or output the data used in the operation ((4f) of FIG. 4).

The offset component removal unit 212 stores, in the RAM ram1, the coefficient generated based on the result of operation. In response to the falling edge of the operation enable signal OEN1, the offset component removal unit 212 outputs the pixel data (R+NIR, G+NIR, B+NIR, and NIR) from which the offset component os has been removed to the invisible component removal unit 213 ((4g) of FIG. 4).

In response to the rising edge of the operation enable signal OEN2, the invisible component removal unit 213 removes the invisible component NIR from the pixel data (R+NIR, G+NIR, and B+NIR) received from the offset component removal unit 212 ((4h) of FIG. 4). When executing the operation for removing the invisible component NIR (in the second period Tp2 in which the operation enable signal OEN2 is at the high level), the invisible component removal unit 213 accesses the FIFO memory fifo1 to input or output the data used in the operation ((4i) of FIG. 4).

With the operation enable signals OEN1 and OEN2 whose high-level periods do not overlap each other, the offset component removal unit 212 and the invisible component removal unit 213 can exclusively operate at different times. This configuration can shift the period in which the offset component removal unit 212 accesses the FIFO memory fifo1 and the period in which the invisible component removal unit 213 accesses the FIFO memory fifo1 from each other. As a result, the offset component removal unit 212 and the invisible component removal unit 213 can share the FIFO memory fifo1, and the circuit scale of the memory unit 231 can be reduced.

In response to the falling edge of the operation enable signal OEN2, the invisible component removal unit 213 outputs the pixel data (R, G, B) from which the invisible component NIR has been removed to the shading correction unit 214 ((4j) of FIG. 4). The invisible component removal unit 213 outputs the pixel data (NIR) of the invisible light component received from the offset component removal unit 212 to the shading correction unit 214 as it is. The shading correction unit 214 performs shading correction on the pixel data (R, G, B) and the pixel data (NIR).

As described above, in the present embodiment, with the operation enable signals OEN1 and OEN2 whose high-level periods do not overlap each other, the period in which the offset component removal unit 212 accesses the FIFO memory fifo1 and the period in which the invisible component removal unit 213 accesses the FIFO memory fifo1 can be shifted from each other. Accordingly, the offset component removal unit 212 and the invisible component removal unit 213 can share the FIFO memory fifo1. As a result, an increase in the usage of the FIFO memory fifo1 (in other words, an increase in the required capacity of the FIFO memory fifo1) can be reduced, and the circuit scale of the memory unit 231 can be reduced. In other words, an increase in the usage of the FIFO memory fifo1 in image processing of the visible light component and the invisible light component acquired by the image sensors 9a and 9b can be minimized.

With the action of the selector SEL1, the unit that connects to the FIFO memory fifo1 can be switched between the offset component removal unit 212 and the invisible component removal unit 213. The image processor 200 can process the image data received from the image reading unit 101, for example, line by line.

The image processor 200 removes the offset component from the visible light components (each including the invisible light component) and the invisible light component received from the image sensors 9a and 9b, and further removes the invisible light component (for example, near-infrared light component) from the visible light components. Accordingly, even when the image sensor 9a detects visible light components including invisible light components, image data including only visible light components can be generated.

Furthermore, the image processor 200 performs shading correction on the image data including only the visible light components, so as to correct color unevenness and brightness unevenness caused by the image sensor 9a or the optical system. Further, the image processor 200 performs shading correction on the image data including only the invisible light component, so as to correct brightness unevenness caused by the image sensor 9b or the optical system.

A second embodiment is described below.

Figure 5:
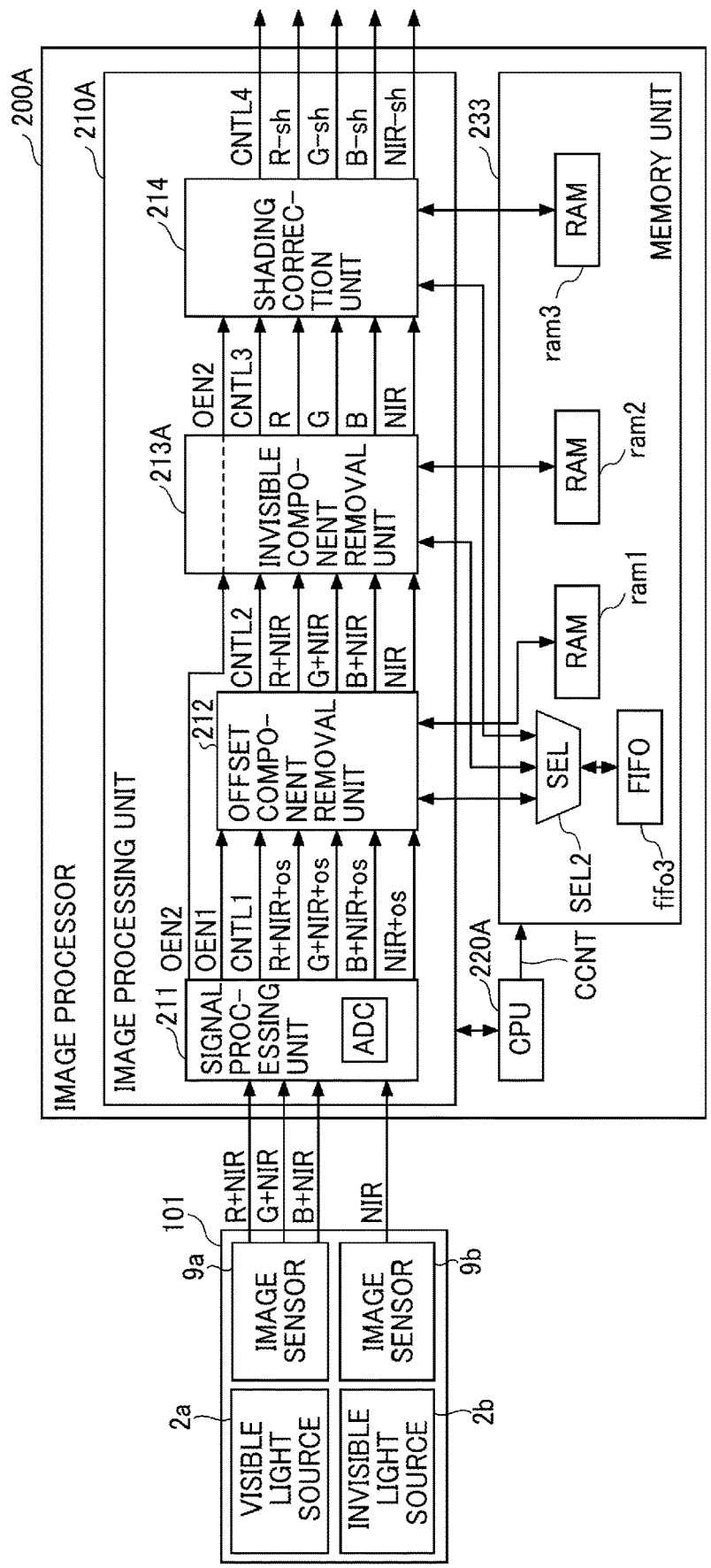
FIG. 5 is a block diagram of an image processor according to a second embodiment.

FIG. 5 is a block diagram schematically illustrating a configuration of an image processor according to a second embodiment. Elements similar to those described with reference to FIGS. 1 to 4 are denoted by the same or similar reference numerals, and detailed descriptions thereof may be omitted. For example, an image processor 200A illustrated in FIG. 5 is mounted in the image forming apparatus 100 instead of the image processor 200 in FIG. 1.

The image processor 200A includes an image processing unit 210A instead of the image processing unit 210 in FIG. 3, a CPU 220A instead of the CPU 220 in FIG. 3, and a memory unit 233 instead of the memory units 231 and 232 in FIG. 3. The image processing unit 210A includes an invisible component removal unit 213A instead of the invisible component removal unit 213 in FIG. 3.

The invisible component removal unit 213A functions similarly to the invisible component removal unit 213 illustrated in FIG. 3 except that the operation enable signal OEN2 received from the signal processing unit 211 is output to the shading correction unit 214 as it is. The memory unit 233 includes a selector SEL2, a FIFO memory fifo3 for storing data in process of operation, and the RAM ram1, the RAM ram2, and the RAM ram3 for storing coefficients.

The CPU 220A functions similarly to the CPU 220 illustrated in FIG. 3 except that a function of outputting a CPU control signal CCNT is added. In the CPU 220A, the functional unit that generates the CPU control signal CCNT serves as a selection signal output unit. The CPU control signal CCNT serves as a selection signal.

The selector SEL2 connects the offset component removal unit 212, the invisible component removal unit 213A, or the shading correction unit 214 to the FIFO memory fifo3. For example, the selector SEL2 connects the offset component removal unit 212 to the FIFO memory fifo3 while the operation enable signal OEN1 output from the signal processing unit 211 indicates the valid level.

When the enable signal OEN2 output from the signal processing unit 211 is at the valid level and the CPU control signal CCNT is at a high level, the selector SEL2 connects the invisible component removal unit 213A to the FIFO memory fifo3. The CPU control signal CCNT is output from the CPU 220A. The CPU control signal CCNT may be output from, for example, a general-purpose input/output port of the CPU 220A. The high level of the CPU control signal CCNT is an example of a first level.

When the enable signal OEN2 output from the signal processing unit 211 is at the valid level and the CPU control signal CCNT is at a low level, the selector SEL2 connects the shading correction unit 214 to the FIFO memory fifo3. The low level of the CPU control signal CCNT is an example of a second level. In this way, the FIFO memory fifo3 is shared by the offset component removal unit 212, the invisible component removal unit 213A, and the shading correction unit 214.

The RAM ram1 stores the coefficient generated by the offset component removal unit 212 based on the result of the operation for offset component removal. The RAM ram2 stores the coefficient generated by the invisible component removal unit 213A based on the result of the operation for invisible light component removal. The RAM ram3 stores the coefficient generated by the shading correction unit 214 based on the result of the operation for shading correction.

Figure 6:
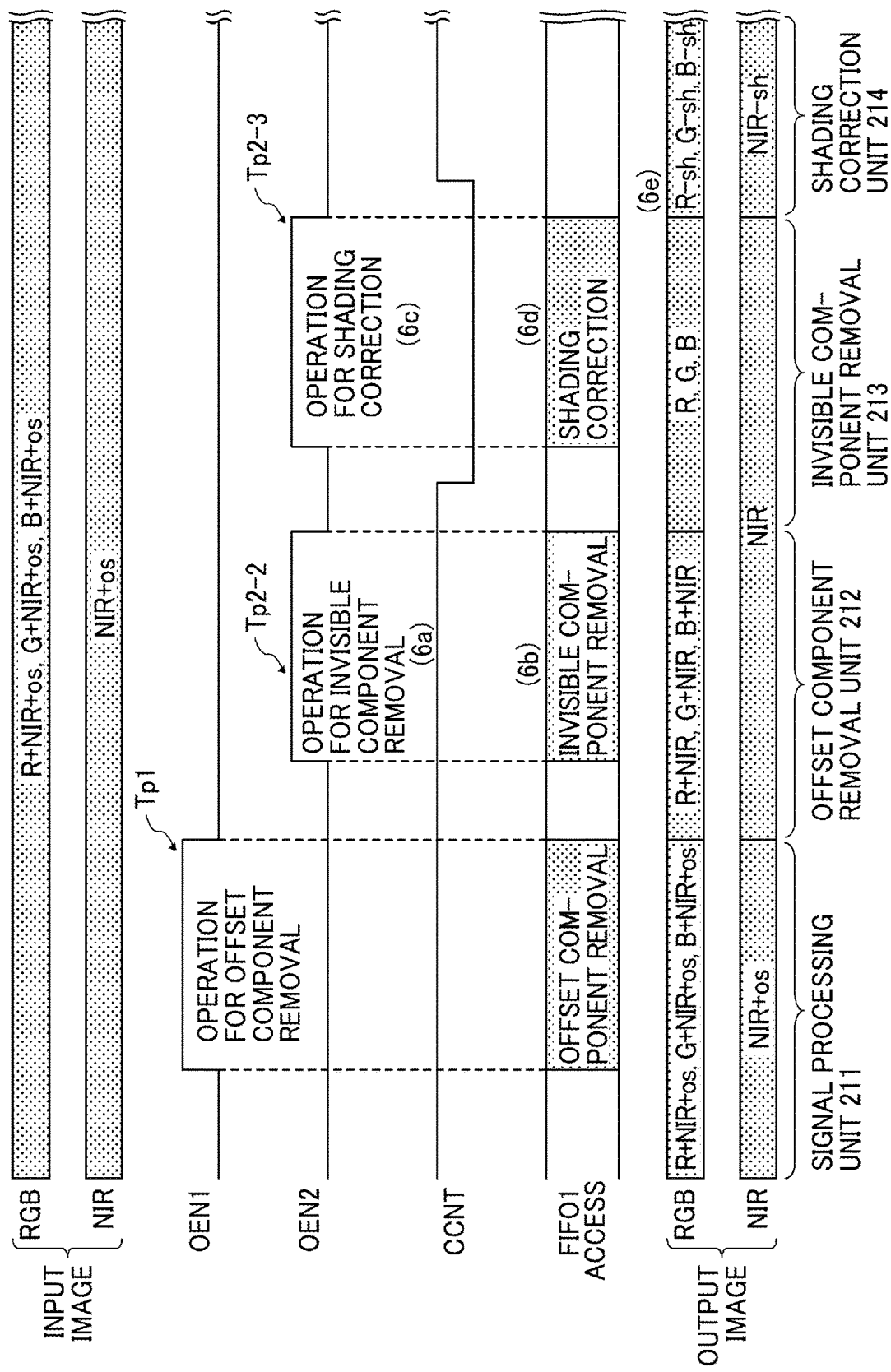
FIG. 6 is a timing chart illustrating an operation of the image processor illustrated in FIG. 5.

FIG. 6 is a timing chart illustrating an operation of the image processor 200A illustrated in FIG. 5. The operation illustrated in FIG. 6 is similar to the operation illustrated in FIG. 4 except that the invisible component removal unit 213A or the shading correction unit 214 is connected to the FIFO memory fifo3 in response to the operation enable signal OEN2 at the high level and the logic level of the CPU control signal CCNT. Similar to FIG. 4, pixel data of one line is processed in an example illustrated in FIG. 6, but pixel data for a plurality of lines may be processed.

When the CPU control signal CCNT is at a high level at the rising edge of the operation enable signal OEN2, the invisible component removal unit 213A performs an operation for removing the invisible component NIR from the pixel data (R+NIR, G+NIR, and B+NIR) ((6a) of FIG. 6). When executing the operation for removing the invisible component NIR (in a second period Tp2-2 in which the operation enable signal OEN2 and the CPU control signal CCNT are at the high level), the invisible component removal unit 213A stores the data in process of the operation in the FIFO memory fifo3 ((6b) of FIG. 6). By contrast, when the CPU control signal CCNT is at a low level at the rising edge of the operation enable signal OEN2, the invisible component removal unit 213A inhibits the execution of the operation for removing the invisible component NIR.

When the CPU control signal CCNT is at the low level at the rising edge of the operation enable signal OEN2, the shading correction unit 214 performs the operation for shading correction on the pixel data (R, G, B) and the pixel data (NIR) ((6c) of FIG. 6). The shading correction unit 214 stores in the FIFO memory fifo3 the data in process of the operation during the execution of the operation for shading correction (in a third period Tp2-3 in which the operation enable signal OEN2 is at the high level and the CPU control signal CCNT is at the low level) ((6d) of FIG. 6).

In response to the falling edge of the operation enable signal OEN2, the shading correction unit 214 outputs the pixel data (R-sh, G-sh, B-sh, and NIR-sh) after the shading correction to the optical writing device 109 ((6e) of FIG. 6). When the CPU control signal CCNT is at the high level at the rising edge of the operation enable signal OEN2, the shading correction unit 214 inhibits the execution of the operation for shading correction.

In the present embodiment, the high-level periods of the operation enable signals OEN1 and OEN2 do not overlap each other, and the two high-level periods (the second period Tp2-2 and the third period Tp2-3) of the operation enable signal OEN2 can be distinguished by the logic level of the CPU control signal CCNT. With this configuration, the offset component removal unit 212, the invisible component removal unit 213A, and the shading correction unit 214 can exclusively operate at different times. This configuration can shift the period in which the offset component removal unit 212 accesses the FIFO memory fifo3, the period in which the invisible component removal unit 213A accesses the FIFO memory fifo3, and the period in which the shading correction unit 214 accesses the FIFO memory fifo3 from each other. As a result, the offset component removal unit 212, the invisible component removal unit 213A, and the shading correction unit 214 can share the FIFO memory fifo3, and the circuit scale of the memory unit 233 can be reduced.

As described above, in the present embodiment, the effects similar to those of the first embodiment can be obtained. For example, the period in which the offset component removal unit 212 accesses the FIFO memory, the period in which the invisible component removal unit 213A accesses the FIFO memory, and the period in which the shading correction unit 214 accesses the FIFO memory can be shifted from each other.

Accordingly, the FIFO memory can be shared by the offset component removal unit 212, the invisible component removal unit 213A, and the shading correction unit 214. As a result, an increase in the usage of the FIFO memory can be reduced, and the circuit scale of the memory unit 233 can be reduced.

A description is given below of an image processor according to a comparative example.

Figure 7:
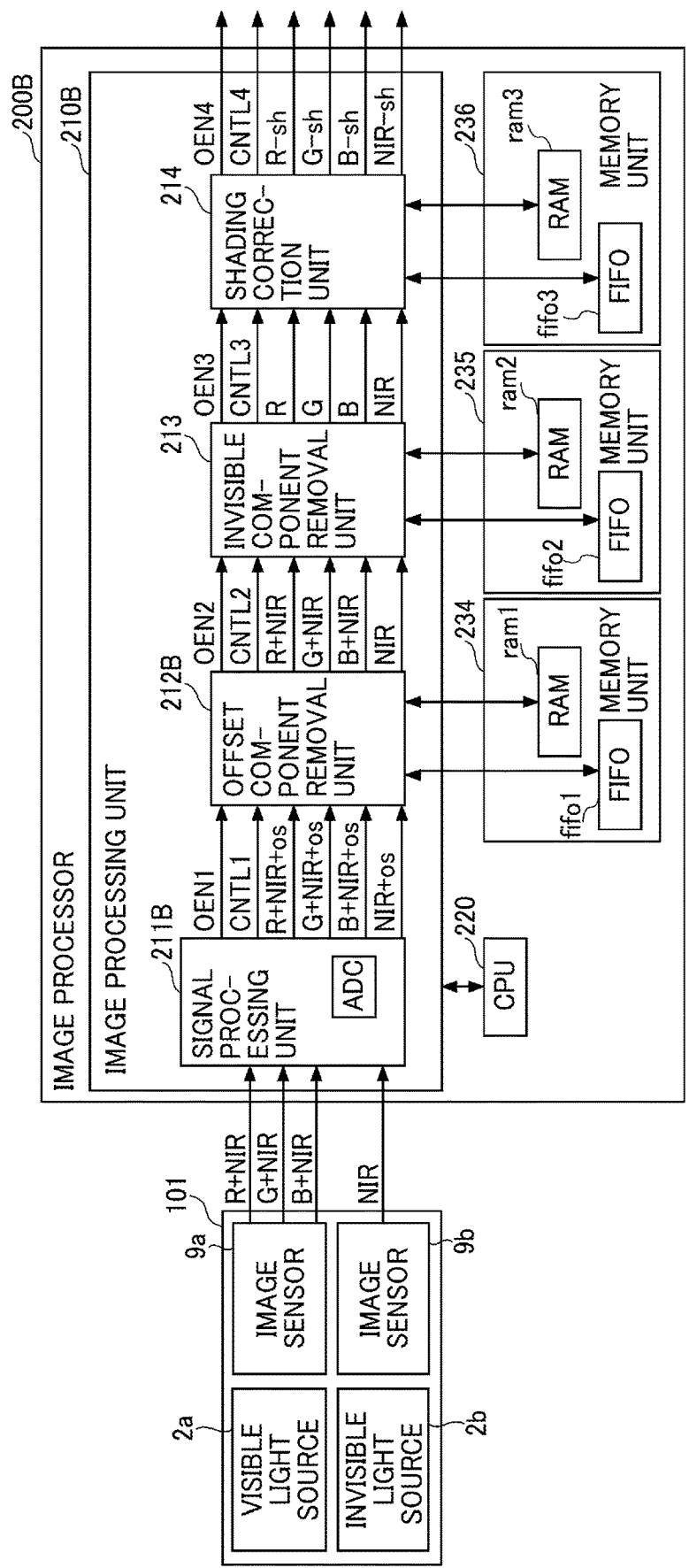
FIG. 7 is a block diagram of an image processor according to a comparative example.

FIG. 7 is a block diagram illustrating the image processor according to the comparative example. Elements similar to those described with reference to FIGS. 1 to 3 are denoted by the same or similar reference numerals, and detailed descriptions thereof may be omitted. For example, an image processor 200B illustrated in FIG. 7 is mounted in the image forming apparatus 100 instead of the image processor 200 in FIG. 1.

The image processor 200B includes an image processing unit 210B and memory units 234, 235, and 236 instead of the image processing unit 210 and the memory units 231 and 232 in FIG. 3. The image processor 200B includes a signal processing unit 211B and an offset component removal unit 212B instead of the signal processing unit 211 and the offset component removal unit 212 illustrated in FIG. 3. The configuration of other elements of the image processor 200B are the same as those of the image processor 200 in FIG. 3.

The signal processing unit 211B functions similarly to the signal processing unit 211 of FIG. 3 except that the signal processor does not output the operation enable signal OEN2. The offset component removal unit 212B has the function of outputting the operation enable signal OEN2 in addition to the functions of the offset component removal unit 212 illustrated in FIG. 3.

The memory unit 234 includes the FIFO memory fifo1 for operation and the RAM ram1 for coefficients. While the offset component removal unit 212B executes the operation, the data used in the operation for removing the offset components os is input to and output from the FIFO memory fifo1. The RAM ram1 stores the coefficient generated by the offset component removal unit 212B based on the result of the operation for offset component removal.

The memory unit 235 includes the FIFO memory fifo2 for operation and the RAM ram2 for coefficients. While the invisible component removal unit 213 executes the operation, the data used in the operation for removing the invisible component NIR is input to and output from the FIFO memory fifo2. The RAM ram2 stores the coefficient generated by the invisible component removal unit 213 based on the result of the operation for invisible light component removal.

The memory unit 236 includes the FIFO memory fifo3 for operation and the RAM ram3 for coefficients. While the shading correction unit 214 executes the operation, the data used in the operation for shading correction is input to and output from the FIFO memory fifo3. The RAM ram3 stores the coefficient generated by the shading correction unit 214 based on the result of the operation for shading correction.

In the image processor 200B illustrated in FIG. 7, the offset component removal unit 212B, the invisible component removal unit 213, and the shading correction unit 214 are provided with the FIFO memories fifo1, fifo2, and fifo3, respectively. As a result, as compared with the configurations in FIGS. 3 and 5, the circuit scale of the memory units 234, 235, and 236 increases, and the cost of the image processor 200B increases.

Further, the operation enable signal OEN1 output by the signal processing unit 211B and the operation enable signal OEN2 output by the offset component removal unit 212B are generated independently of each other. As a result, there is a possibility that the operation enable signal OEN1 changes to the high level while the operation enable signal OEN2 at the high level is being output. In this case, the invisible component removal by the invisible component removal unit 213 may be started during the offset components removal by the offset component removal unit 212B, which may hinder normal image processing.

The present disclosure includes, for example, the following aspects.

According to Aspect 1, an image processor includes a signal processing unit, an offset component removal unit, an invisible component removal unit, and a signal setting unit. The signal processing unit performs signal processing on a visible light component and an invisible light component received from an image sensor.

The offset component removal unit performs an offset component removal operation in a period in which a first operation enable signal indicates a valid level. In the offset component removal operation, an offset component is removed from each of the visible light component after the signal processing and the invisible light component after the signal processing, and data in process of the operation is stored in a storage unit.

The invisible component removal unit performs an invisible component removal operation in a period in which a second operation enable signal indicates a valid level. In the invisible component removal operation, from the visible light component from which the offset component has been removed, the invisible light component from which the offset component has been removed is removed, so as to generate image data of a visible light component from which the invisible light component has been removed, and data in process of the operation is stored in the storage unit.

The signal setting unit sets the first operation enable signal to the valid level in a first period based on the fact that the signal processing of the first visible light component and the first invisible light component has been performed by the signal processing unit, and sets the second operation enable signal to the valid level after the first period has elapsed.

According to Aspect 2, the image processor of Aspect 1 further includes a selector to connect the offset component removal unit to the storage unit in the period in which the first operation enable signal indicates the valid level, and connect the invisible component removal unit to the storage unit in the period in which the second operation enable signal indicates the valid level, and the storage unit stores the data used in the offset component removal operation performed by the offset component removal unit or the data used in the invisible component removal operation performed by the invisible component removal unit.

According to Aspect 3, the image processor of Aspect 1 further includes a shading correction unit, a selection signal output unit, and a selector.

The shading correction unit performs a shading correction operation on the image data of the visible light component from which the invisible light component has been removed, and stores data in process of the shading correction operation in the storage unit data.

The selection signal output unit outputs a selection signal at a first level during a period in which the invisible component removal unit operates, and outputs the selection signal at a second level during a period in which the shading correction unit operates.

The selector connects the storage unit to the offset component removal unit during the period in which the first operation enable signal indicates the valid level, connects the storage unit to the invisible component removal unit during a period in which the second operation enable signal indicates the valid level and the selection signal is at the first level, and connects the storage unit to the shading correction unit during a period in which the second operation enable signal indicates the valid level and the selection signal is at the second level.

According to Aspect 4, in the image processor of any one of Aspects 1 to 3, the image sensor is a line sensor, and the signal processing unit performs the signal processing each time the visible light component and the invisible light component of at least one line are received from the image sensor.

The offset component removal unit removes the offset component from the visible light component and the invisible light component of pixels of each line, and the invisible component removal unit removes the invisible light component from the visible light component of the pixels of each line.

According to Aspect 5, in the image processor of any one of Aspects 1 to 4, the image sensor includes a first image sensor to detect a visible light component including an invisible light component, and a second image sensor to detect an invisible light component.

According to Aspect 6, in the image processor of any one of Aspects 1 to 5, the visible light component including an invisible light component is near-infrared light.

According to Aspect 7, an image forming apparatus includes an image reader including an image sensor, an image processor, and an image forming device to form an image using image data having been processing by the image processor.

The image processor includes a signal processing unit, an offset component removal unit, an invisible component removal unit, and a signal setting unit.

The signal processing unit performs signal processing on a visible light component and an invisible light component received from the image sensor.

The offset component removal unit performs an offset component removal operation in a period in which a first operation enable signal indicates a valid level. In the offset component removal operation, an offset component is removed from each of the visible light component after the signal processing and the invisible light component after the signal processing, and data in process of the operation is stored in a storage unit.

The invisible component removal unit performs an invisible component removal operation in a period in which a second operation enable signal indicates a valid level. In the invisible component removal operation, from the visible light component from which the offset component has been removed, the invisible light component from which the offset component has been removed is removed, so as to generate image data of a visible light component from which the invisible light component has been removed, and data in process of the operation is stored in the storage unit.

The signal setting unit sets the first operation enable signal to the valid level in a first period based on the fact that the signal processing of the first visible light component and the first invisible light component has been performed by the signal processing unit, and sets the second operation enable signal to the valid level after the first period has elapsed.

Aspect 8 concerns an image processing method performed by an image processor for processing a first visible light component received from an image sensor and a first invisible light component received from an image sensor. The visible light component includes an invisible light component. The method includes performing signal processing on the first visible light component and the first invisible light component received from the image sensor, and performing an offset component removal operation in a period in which a first operation enable signal indicates a valid level. In the offset component removal operation, an offset component is removed from each of the visible light component after the signal processing and the invisible light component after the signal processing, and data in process of the operation is stored in a storage unit. The method further includes performing an invisible component removal operation in a period in which a second operation enable signal indicates a valid level. In the invisible component removal operation, from the visible light component from which the offset component has been removed, the invisible light component from which the offset component has been removed is removed, so as to generate image data of a visible light component from which the invisible light component has been removed, and data in process of the operation is stored in the storage unit. The method further includes setting the first operation enable signal to the valid level in a first period based on a fact that the signal processing of the first visible light component and the first invisible light component has been performed, and setting the second operation enable signal to the valid level after the first period has elapsed.

The example embodiments of the present disclosure are described above, but the present disclosure is not limited to the elements of the above-described embodiments. The above-described elements may be changed within a range that does not impair the gist of the present disclosure, in accordance with the application of the disclosure.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image processor comprising
a memory;
a signal processing circuit configured to perform signal processing on a first visible light component and a first invisible light component received from an image sensor, to generate a second visible light component and a second invisible light component, respectively, the first visible light component including an invisible light component;
a signal setting circuit configured to set a first operation enable signal to a valid level in a first period based on execution of the signal processing, and set a second operation enable signal to a valid level after an elapse of the first period;
an offset component removal circuit configured to perform an offset component removal operation in a period in which the first operation enable signal indicates the valid level while storing data in process in the memory, the offset component removal operation being for removing an offset component from each of the second visible light component and the second invisible light component, to output a third invisible light component and a third visible light component, respectively; and
an invisible component removal circuit configured to perform an invisible component removal operation in a period in which the second operation enable signal indicates the valid level while storing data in process in the memory, the invisible component removal operation being for removing the third invisible light component from the third visible light component, to generate image data of a fourth visible light component from which the invisible light component has been removed.

2. The image processor according to claim 1, further comprising a selector to connect the offset component removal circuit to the memory in the period in which the first operation enable signal indicates the valid level and connect the invisible component removal circuit to the memory in the period in which the second operation enable signal indicates the valid level,
wherein the data used in the offset component removal operation or the data used in the invisible component removal operation is stored in the memory in accordance with an action by the selector.

3. The image processor according to claim 1, further comprising:
a shading correction circuit configured to perform a shading correction operation on the image data of the fourth visible light component while storing data in process in the memory;
a selection signal output circuit configured to output a selection signal at a first level during a period in which the invisible component removal circuit operates, and output the selection signal at a second level during a period in which the shading correction circuit operates; and
a selector to:
connect the memory to the offset component removal circuit in the period in which the first operation enable signal indicates the valid level;
connect the memory to the invisible component removal circuit in a period in which the second operation enable signal indicates the valid level and the selection signal is at the first level; and
connect the memory to the shading correction circuit in a period in which the second operation enable signal indicates the valid level and the selection signal is at the second level.

4. The image processor according to claim 1,
wherein the image sensor is a line sensor,
wherein the signal processing circuit is configured to perform the signal processing each time the first visible light component and the first invisible light component of at least one line are received from the image sensor,
wherein the offset component removal circuit is configured to remove the offset component from the second visible light component and the second invisible light component of pixels of each line, and
wherein the invisible component removal circuit is configured to remove the third invisible light component from the third visible light component of the pixels of each line.

5. The image processor according to claim 1,
wherein the image sensor includes:
a first image sensor to detect a visible light component including an invisible light component; and
a second image sensor to detect an invisible light component.

6. The image processor according to claim 1,
wherein the first visible light component including an invisible light component is a near-infrared light component.

7. An image forming apparatus comprising:
an image reader including an image sensor;
an image processor including:
a memory;
a signal processing circuit configured to perform signal processing on a first visible light component and a first invisible light component received from an image sensor, to generate a second visible light component and a second invisible light component, respectively, the first visible light component including an invisible light component;
a signal setting circuit configured to set a first operation enable signal to a valid level in a first period based on execution of the signal processing, and set a second operation enable signal to a valid level after an elapse of the first period;
an offset component removal circuit configured to perform an offset component removal operation in a period in which the first operation enable signal indicates the valid level while storing data in process in the memory, the offset component removal operation being for removing an offset component from each of the second visible light component and the second invisible light component, to output a third invisible light component and a third visible light component, respectively; and
an invisible component removal circuit configured to perform an invisible component removal operation in a period in which the second operation enable signal indicates the valid level while storing data in process in the memory, the invisible component removal operation being for removing the third invisible light component from the third visible light component, to generate image data of a fourth visible light component from which the invisible light component has been removed; and
an image forming device to form an image using the image data processed by the image processor.

8. A method for processing a visible light component and an invisible light component, the method comprising:
- performing signal processing on a first visible light component and a first invisible light component received from an image sensor, to generate a second visible light component and a second invisible light component, respectively, the first visible light component including an invisible light component;
- setting a first operation enable signal to a valid level in a first period based on execution of the signal processing;
- performing an offset component removal operation in a period in which the first operation enable signal indicates the valid level while storing data in process in a memory, the offset component removal operation being for removing an offset component from each of the second visible light component and the second invisible light component, to output a third invisible light component and a third visible light component, respectively;
- setting a second operation enable signal to a valid level in a second period after an elapse of the first period; and
- performing an invisible component removal operation in a period in which the second operation enable signal indicates the valid level while storing data in process in the memory, the invisible component removal operation being for removing the third invisible light component from the third visible light component, to generate image data of a fourth visible light component.

* * * * *